US009680983B1

(12) United States Patent
Schuster et al.

(10) Patent No.: US 9,680,983 B1
(45) Date of Patent: Jun. 13, 2017

(54) PRIVACY MODE DETECTION AND RESPONSE OVER VOICE ACTIVATED INTERFACE

(71) Applicant: Motorola Mobility LLC, Chicago, IL (US)

(72) Inventors: Adrian M. Schuster, West Olive, MI (US); Rajib Acharya, Vernon Hills, IL (US); Roger W. Ady, Chicago, IL (US); Plamen A. Ivanov, Schaumburg, IL (US); Mark A. Jasiuk, Chicago, IL (US); Dusan Macho Cierna, Arlington Heights, IL (US); Robert Zurek, Antioch, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/184,684

(22) Filed: Jun. 16, 2016

(51) Int. Cl.
| | |
|---|---|
| *H04M 1/00* | (2006.01) |
| *H04M 1/725* | (2006.01) |
| *G06K 9/00* | (2006.01) |
| *G06F 3/16* | (2006.01) |
| *G10L 17/22* | (2013.01) |
| *G01S 11/02* | (2010.01) |
| *H04W 88/02* | (2009.01) |

(52) U.S. Cl.
CPC ......... *H04M 1/72569* (2013.01); *G01S 11/02* (2013.01); *G06F 3/165* (2013.01); *G06K 9/00255* (2013.01); *G06K 9/00315* (2013.01); *G10L 17/22* (2013.01); *H04W 88/02* (2013.01)

(58) Field of Classification Search
CPC .... H04M 1/72563; G01S 11/16; G06F 3/165; G06K 9/0048; G06K 9/00315

USPC ............ 455/563, 550.1; 379/88.01; 704/231
See application file for complete search history.

(56) References Cited

U.S. PATENT DOCUMENTS

| | | | | |
|---|---|---|---|---|
| 7,124,372 | B2 * | 10/2006 | Brin | .................... H04L 12/1822 715/751 |
| 8,818,175 | B2 * | 8/2014 | Dubin | ................... H04N 7/155 386/282 |
| 2010/0294938 | A1 * | 11/2010 | Alameh | ................ G06F 3/0308 250/342 |

(Continued)

OTHER PUBLICATIONS (2011) Audio-Visual Isolated Digit Recognition for Whispered Speech Xing Fan, Carlos Busso, and John H.L. Hansen Center for Robust Speech Systems(CRSS), University of Texas at Dallas, Richardson, Texas 75083, xxf064000, busso, john. hansen@utdallas.edu.

(Continued)

*Primary Examiner* — Sonny Trinh
(74) *Attorney, Agent, or Firm* — Miller, Matthias & Hull LLP (57) ABSTRACT

A portable electronic communication device includes a user input receiver, one or more user outputs, and a processor programmed to receive user input from the user input receiver and to determine based on the user input whether the user desires the device to enter a private mode. The device alters communications from the device via the one or more user outputs while in the private mode, and enters the private mode if the user input indicates that the user desires the device to enter the private mode. While in the private mode, the device may alter the manner in which it communicates to the user.

19 Claims, 4 Drawing Sheets

(56) References Cited

U.S. PATENT DOCUMENTS

2012/0150544 A1* 6/2012 Mcloughlin ............ G10L 25/03
                                                          704/262
2015/0195411 A1* 7/2015 Krack ................... H04M 3/569
                                                        379/202.01

OTHER PUBLICATIONS (Apr. 19, 2009) Speaker Identification With Whispered Speech Based on Modified LFCC Parameters and Feature Mapping Xing Fan and John H.L. Hansen Center for Robust Speech Systems (CRSS) Erik Jonsson School of Engineering & Computer Science University of Texas at Dallas, Richardson, Texas 75083, USA.

* cited by examiner

PRIVACY MODE DETECTION AND RESPONSE OVER VOICE ACTIVATED INTERFACE

TECHNICAL FIELD

The present disclosure is related generally to mobile communication devices, and, more particularly, to a system and method for modifying a communication mode of a mobile communication device based on user speech characteristics.

BACKGROUND

Voice recognition is used in various contexts to verify the identity of a speaker. For example, the owner of a mobile phone may be able to unlock the phone by speaking a word or phrase that the receiving device is able to recognize, based on prior training, as having been spoken by an authorized user. Once the user is recognized as an authorized user, the device allows access. Speech recognition may be used once the device is unlocked, in order to recognize and interpret spoken commands. The salient aspect of the user's voice in all such interactions is simply that the voice can be linked to a person or can be interpreted, e.g., as a command or query.

However, humans often convey information other than identity and language in the spoken word when speaking to one another. For example, a person may raise their voice, conveying anger or excitement in addition to their identity and the actual linguistic content of the words. Similarly, a person may lower their voice to convey confidentiality or secrecy.

While the present disclosure is directed to a system that can eliminate certain shortcomings noted in or apparent from this Background section, it should be appreciated that such a benefit is neither a limitation on the scope of the disclosed principles nor of the attached claims, except to the extent expressly noted in the claims. Additionally, the discussion in this Background section is reflective of the inventors' own observations, considerations, and thoughts, and is not intended to catalog or summarize any item of prior art. As such, the inventors expressly disclaim this section as admitted or assumed prior art. Moreover, the identification or implication herein of a desirable course of action reflects the inventors' own observations and ideas, and therefore cannot be assumed to indicate an art-recognized desirability.

SUMMARY

In keeping with an embodiment of the disclosed principles, a portable electronic communication device is provided having a user input receiver and one or more user outputs, as well as a processor programmed to receive user input from the user input receiver and to determine whether the user desires the device to enter a private mode based on the user input. The device enters the private mode if the user input indicates that the user desires the device to enter the private mode, and alters the manner in which it communicates with the user via the one or more user outputs while in the private mode.

In another embodiment of the disclosed principles, a method for controlling a mode of a portable electronic communication device is provided. In this embodiment, the device receives user input and determines whether the user input is indicative of a user intent for the device to enter a private mode. The device enters the private mode if the user input so indicates and thereafter alters the way in which communicates to the user.

In yet another embodiment, a method is provided for communicating from a portable electronic device to a user of the device. The method of this embodiment entails receiving an utterance from the user, determining whether the utterance is a whispered utterance, and altering communications from the device to the user if the user has whispered the utterance. In the altered condition, normally audible communications from the device are instead played at reduced volume or are displayed and not audibly played at all.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a fuller discussion of the disclosed principles, an overview is given to aid the reader in understanding the later material. As noted above, current voice and speech recognition systems are focused on either the identity of the speaker or the linguistic content of the speech. However, all or most such systems are not able to interpret a characteristic of the voice outside of linguistic content and speaker identity. For example, such systems generally do not differentiate between spoken and whispered speech as long as the speech is intelligible or is able to be used for recognition purposes.

It will be appreciated however, that other aspects of a person's speech may be informative as well. For example, voice characteristics such as volume and tonality (voiced versus unvoiced) may contain information about the nature of the intended interaction. In an embodiment of the disclosed principles, such aspects are employed to modify a communication mode of the device.

For example, in an embodiment, a mobile communication device enters a private communication mode with the user when the user's preceding voice interaction with the device is whispered. The private communication mode ("private mode") allows the user to interact with the device in a private manner, to avoid disturbing other people, to keep their interaction confidential, or simply to avoid social awkwardness associated with communicating with an electronic device.

To detect the Intended Private Interaction, the device may use one or a combination of several methods. In an embodiment, the signal received at the microphone is analyzed to detect a whispered microphone input. As used herein, the terms "whisper" and "whispered" refer to unvoiced or substantially unvoiced speech as well as hushed speech, which may be spectrally distinct from either voiced speech or whispered speech. Continuing, any suitable method may be used in this embodiment to detect whispered input. For example, cepstral analysis applied to the incoming microphone signal may be used to detect whispered input.

Whatever the mechanism for whisper detection, if a whispered microphone input is indeed detected, the device will then flag the whispered information exchange as private in accordance with an embodiment of the disclosed principles. In a further embodiment, the device enters a private mode, such that the exchange subsequent to the whispered input is treated as private.

In addition to whispered audio input, camera image analysis can be used additionally or alternatively to detect that the user intends to enter the private mode. For example, in an embodiment, image analysis is applied to captured images or video to detect a fixed gaze or other indicator of private intent. For example, in an embodiment, the camera is used to capture lip movement which is then used by the device processor to interpret the movements into words. Alternatively or additionally, other sensors may be used as well to detect the user's desire to enter the private mode; for example, proximity sensors can be used to sense proximity of the user.

Once the device has detected an intended private interaction, this mode change alters the way in which the device interacts with the user. For example, the device may typically play audible speech at a normal spoken volume back to the user after the user makes a query. However, if private interaction intention is detected, the device may significantly lower the volume of the speech feedback so that only the user or someone very close to the device (e.g., within one or two feet) will be able to hear the response.

Alternately, the device may present the information visually rather than audibly. Further aspects of the private mode in various embodiments enable the device to synthesize whispered speech feedback or provide tactile feedback. In addition, the algorithm and database used for speech to text conversion may be selected based on whether the device detects a private interaction or not, such that separately optimized algorithms and databases can be used for whispered speech. Speech-to-text algorithms may reside locally on the device or remotely over a network. Additionally, since whispered speech differs substantially from voiced speech, a training algorithm can be used specifically for whispered speech input to improve voice recognition accuracy as the user continues to use the device.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

Figure 1:
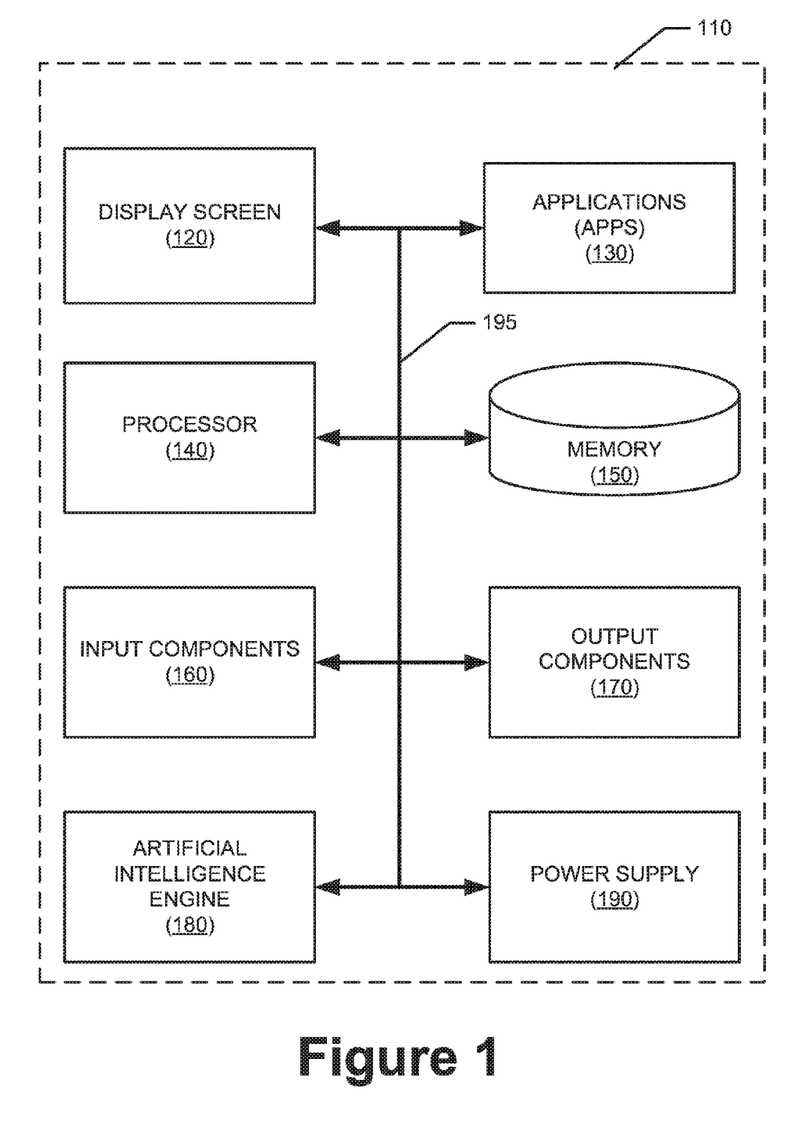
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 (user input receiver) such as speech and text input facilities (audible input receiver and textual input receiver respectively), and one or more output components 170 such as text and audible output facilities, e.g., one or more speakers. In an embodiment, the input components 160 include a physical or virtual keyboard maintained or displayed on a surface of the device. In various embodiments motion sensors, proximity sensors, camera/IR sensors and other types of sensors are used collect certain types of input information such as user presence, user gestures and so on.

The processor 140 may be any of a microprocessor, microcomputer, application-specific integrated circuit, and like structures. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system services and handling of protected and unprotected data stored in the memory 150. Although some applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device 110 also includes an Artificial Intelligence engine (AI engine) 180, which is linked to the device input systems, e.g., the mic, camera and other sensors, and is configured via coded instructions to recognize and interpret user voice or gesture inputs. The AI engine will be discussed at greater length later herein.

In an embodiment, a power supply 190, such as a battery or fuel cell, is included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications). For example, the AI engine is implemented by the processor 140 in an embodiment.

Applications and software are represented on a tangible non-transitory medium, e.g., RAM, ROM or flash memory, as computer-readable instructions. The device 110, via its processor 140, runs the applications and software by retrieving and executing the appropriate computer-readable instructions.

Figure 2:
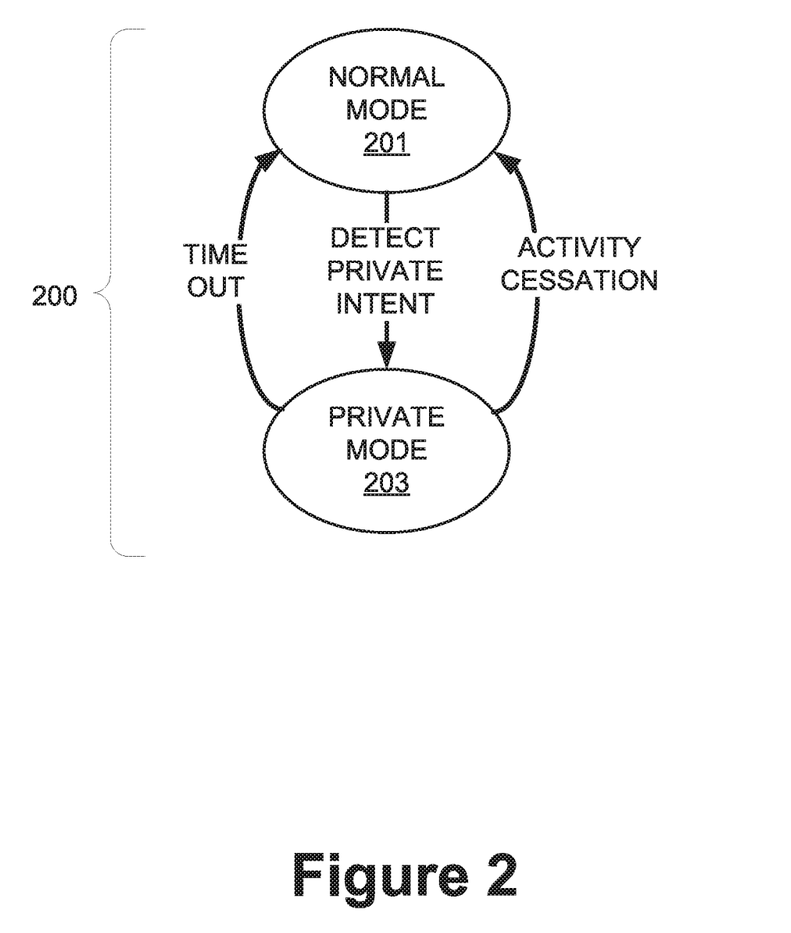
FIG. 2 is a device state diagram in accordance with an embodiment of the disclosed principles.

Turning to FIG. 2, this figure illustrates a state diagram showing the device states and transitions there between as they relate to detection of, and action based on, an intended private interaction. The state space 200 consists of a normal mode state 201 and a private mode state 203. In an embodiment, the device is in the normal mode state 201 by default, e.g., after power up or at the outset of a spoken interaction.

From the normal mode state 201, the device will move to the private mode state 203 in an embodiment when the device detects an intended private interaction from the user. As noted above, this detection may be made via whisper detection, optical analysis or proximity detection. In addition, the user may directly issue a command for the device to enter the private mode, e.g., via a spoken or textual input.

Once in the private mode state 203, the device can return to the normal mode state 201 via one of a number of paths. For example, the device may time out of the private mode 203 by the expiration of a predetermined idle period. That is, the device may set a timer at the cessation of each user utterance or communication from the device, whichever is later, and may then return to the normal mode state 201 if the timer expires without further interaction by the user.

Alternatively, the device may return to the normal mode state 201 from the private mode state 203 when an activity that necessarily involves spoken interaction has ceased. For example, if the device entered the private mode state 203 during a phone call or search session, it may then return to the normal mode state 201 when the phone call or search session ends. Alternatively, the device may return to normal mode if the state of inputs has changed to indicate that private mode is no longer appropriate, e.g., if the user's voice has changed from whispered to normal.

Although FIG. 2 assumes that the default device state is the normal mode state 201, i.e., not private, the private mode state 203 may made the default state in an alternative embodiment, such that the user can issue a command or otherwise indicate an intent to switch to the normal mode state 201.

While the detection of private interaction intent may be applied at an initial authentication stage of the user's interaction with the device, e.g., in asking the user to repeat a password or asking the user for clarification, it may alternatively be applied after authentication of the user. Also, as noted briefly above, one or more recognition algorithms and databases are used for speech to text conversion in general, and in an embodiment of the disclosed principles, at least one algorithm or database for conversion is selected based on detecting that the user desires a private interaction. In this way, specifically optimized algorithms and databases can be used for the text conversion (or recognition) of whispered speech. Recognition algorithms and databases may reside locally on the device or remotely over a network or in both locations. As noted above, hushed speech is included within whispered speech indicative of private intent in an embodiment; detection and interpretation of hushed speech may employ specifically optimized algorithms different than those used for either voiced or unvoiced speech.

Figure 3:
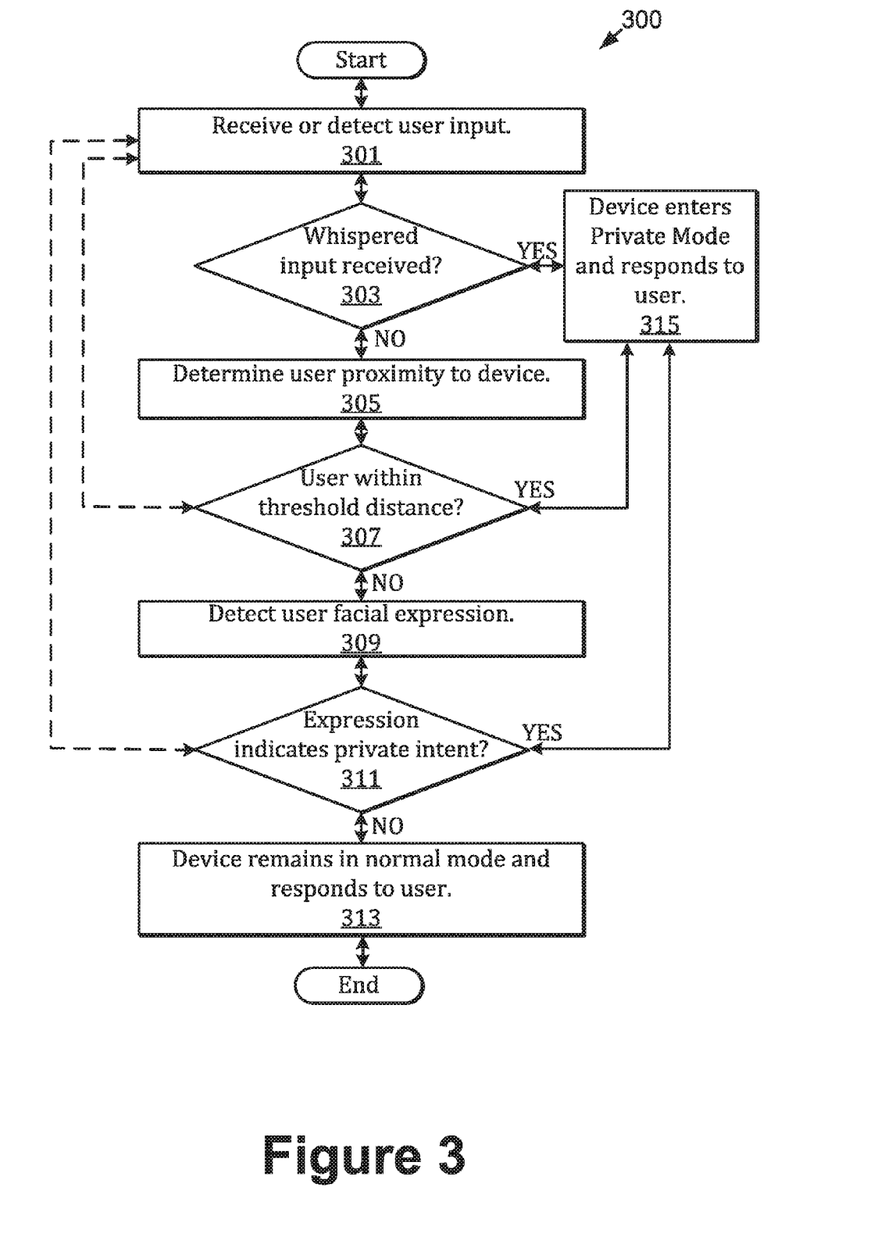
FIG. 3 is flow chart of a process for device control in accordance with an embodiment of the disclosed principles.

Turning to the process flow, FIG. 3 illustrates a flowchart associated with an example process flow in accordance with an embodiment of the disclosed principles. It will be appreciated that the decision stages of the process 300 may be executed serially in any order, or may be executed in parallel. Thus for example, the stage groups (1) 303, (2) 305-307 and (3) 309-311 may be executed at once, with an affirmative response at any decision stage leading to stage 315, or may be executed serially, in the illustrated order or in another order.

As an initial matter, a device such as the device 110 first receives or detects user input at stage 301. Based on this information, the device determines whether or not an indication of private intent has been given by the user. This occurs in stages 303-311 of the process 300. Thus at stage 303, the device evaluates whether a whispered input has been received from the user. As noted above, the terms "whisper" and "whispered" refer to unvoiced or substantially unvoiced speech. The device may detect that spoken input is whispered by using cepstral analysis or other suitable method with respect to the incoming microphone signal.

If it is determined at stage 303 that a whispered input has been received from the user, the process flows to stage 315, wherein the device enters the private mode 203, such that subsequent interactions while in the private mode 203 will be treated as private.

If instead it is determined at stage 303 that a whispered input has not been received, the process 300 flows to stage 305, wherein the device determines user proximity and then to stage 307 wherein the device evaluates whether the determined proximity indicates private intent by the user. In the context of determining private intent, one or both of a user's hands may be on or near the device without indicating private intent; however the proximity of the user's face to the device may be used to indicate private intent. While the degree of proximity required to signal private intent need not be a single fixed value for all implementations, a threshold proximity of 8 inches or less between the user's face and the device is applied in an embodiment to detect private intent.

If it is determined at stage 307 that the determined proximity indicates private intent by the user, then the process 300 flows to stage 315 and the device enters the private mode 203. Otherwise, the process 300 flows to stage 309, wherein the device detects a user facial expression, and then to stage 311, wherein the device determines whether the detected facial expression indicates private intent on the part of the user. As noted above, facial indicators of private intent may include fixed gaze or other common indicators of confidentiality. A facial expression may include modification of any or all of a person's face, and in an embodiment, even includes movement of the user's lips.

If it is determined at stage 311 that the user's facial expression indicates private intent, the process flows to stage 315. Otherwise, the process flows to stage 313, wherein the device remains in the normal mode 201.

Figure 4:
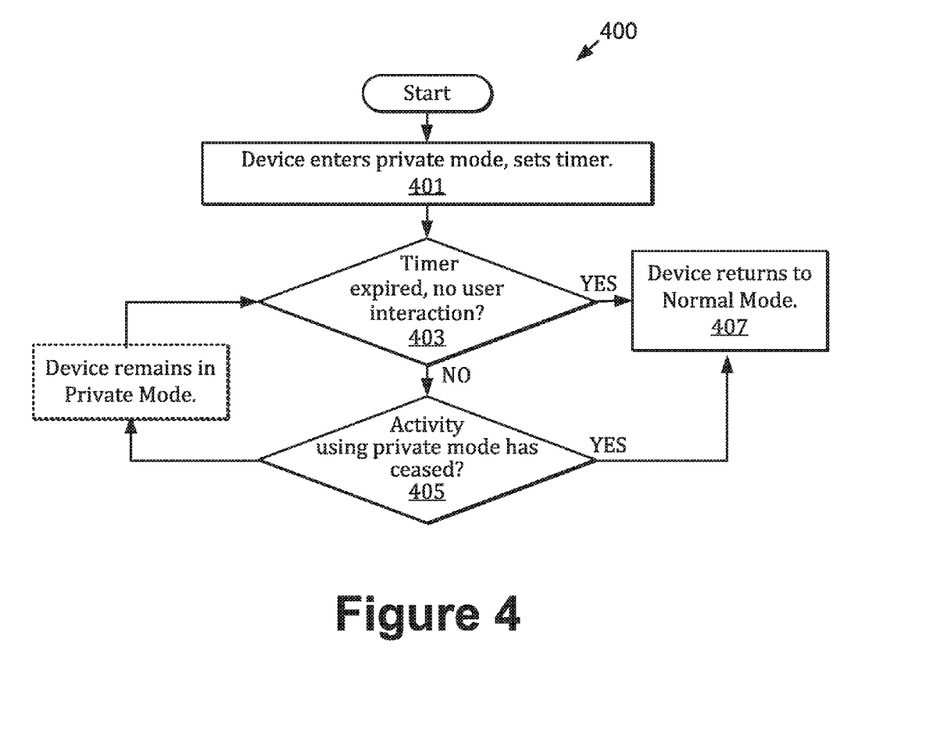
FIG. 4 is a flow chart of a process for returning a device from private mode to normal mode in accordance with an embodiment of the disclosed principles.

Turning to FIG. 4, this Figure shows a process in an embodiment for returning from private mode 203 to normal mode 201. At staged 401 of the process 400, the device sets a timer upon entering the private mode. At stage 403 of the process 400, the device determines whether the timer has expired without another interaction from the user. If so, the device returns to normal mode at stage 407.

Otherwise, the process flows to stage 405 wherein the device determines whether an activity in which the device was using private mode has ceased. For example, a query session or other interaction may have ended, e.g., with the user accepting a search answer or recommendation. If so, the process flows to stage 407. Otherwise, the process remains in private mode 203 and returns to stage 403.

It will be appreciated that a system and method for improved user input interpretation have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic communication device comprising:
   an input receiver configured to receive an input;
   one or more outputs, including an audio speaker; and
   a processor programmed to receive input from the input receiver and to determine whether the received input indicate a desire for the device to enter a private mode, wherein the device alters communications from the device via the one or more outputs while in the private mode by reducing a volume at which the device plays an audible communication via the audio speaker, and to enter the private mode if the received input indicates a desire for the device to enter a private mode.

2. The portable electronic communication device in accordance with claim 1, wherein the input receiver is a microphone.

3. The portable electronic communication device in accordance with claim 2, wherein the step of determining whether the received input indicate a desire for the device to enter a private mode comprises determining whether the input is whispered.

4. The portable electronic communication device in accordance with claim 2, wherein determining whether the received input is whispered comprises applying a cepstral analysis to the received input.

5. The portable electronic communication device in accordance with claim 1, wherein the input receiver is a camera.

6. The portable electronic communication device in accordance with claim 5, wherein the step of determining whether the received input indicate a desire for the device to enter a private mode comprises detecting a facial expression indicative of confidentiality.

7. The portable electronic communication device in accordance with claim 1, wherein the input receiver is a proximity sensor.

8. The portable electronic communication device in accordance with claim 7, wherein the step of determining whether the received input indicate a desire for the device to enter a private mode comprises detecting a human presence within a predetermined threshold distance of the device.

9. The portable electronic communication device in accordance with claim 1, wherein the one or more outputs further include a display screen, and wherein altering communications from the device comprises conveying an otherwise audible communication via the display screen rather than the audio speaker.

10. A method for controlling a mode of a portable electronic communication device comprising:
    receiving input at the device;
    determining whether the input is indicative of an intent for the device to enter a private mode;
    entering the private mode at the device if the input indicates an intent for the device to enter the private mode; and
    while in the private mode, altering a manner in which the device communicates by reducing a volume at which the device plays an audible communication via an audio speaker of the device.

11. The method in accordance with claim 10, wherein receiving input at the device comprises receiving an audible utterance at a microphone.

12. The method in accordance with claim 11, wherein determining whether the input is indicative of an intent for the device to enter a private mode comprises determining whether the input is whispered.

13. The method in accordance with claim 12, wherein determining whether the input is whispered comprises applying a cepstral analysis to the input.

14. The method in accordance with claim 10, wherein receiving input at the device comprises receiving an image from a camera associated with the device.

15. The method in accordance with claim 14, wherein determining whether the input is indicative of an intent for the device to enter a private mode comprises detecting a facial expression indicative of confidentiality.

16. The method in accordance with claim 1, wherein receiving input at the device comprises receiving input from a proximity sensor indicative of a proximity of a human to the device.

17. The method in accordance with claim 16, wherein determining whether the input is indicative of an intent for the device to enter a private mode comprises determining that the human is within a predetermined threshold distance of the device.

18. The method in accordance with claim 10, wherein altering a manner in which the device communicates further comprises conveying an otherwise audible communication via a visible user interface instead.

19. A method of communicating from a portable electronic device to a user of the device comprising:
    detecting an utterance;
    determining whether the utterance is a whispered utterance; and
    altering communications from an audio speaker of the device if the utterance is a whispered utterance by reducing a volume at which the device plays audible communications via the audio speaker, such that otherwise audible communications from the device are played at reduced volume or are displayed and not audibly played.

\* \* \* \* \*